Figure 1:
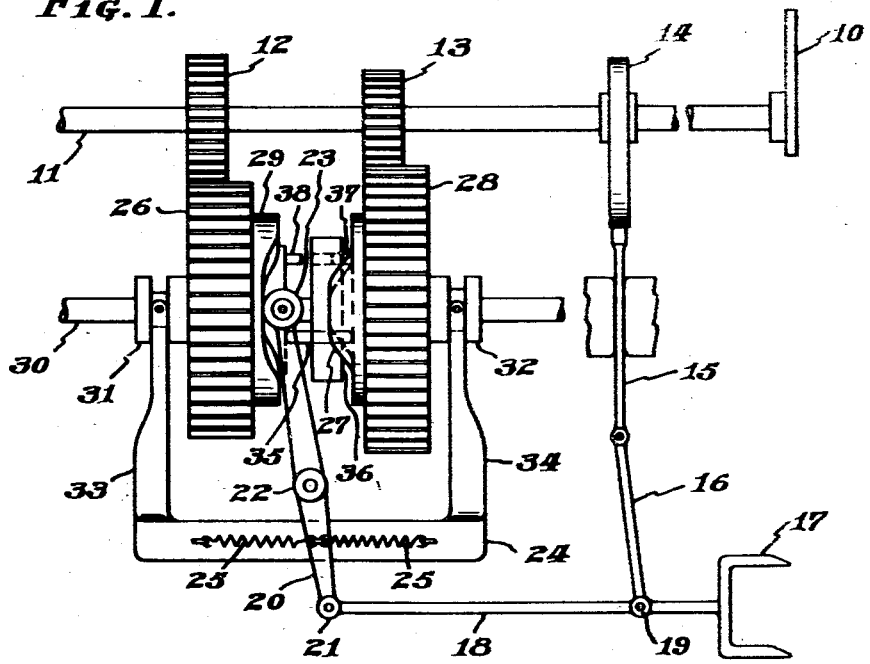

Sept. 19, 1939.    E. W. KELLOGG    2,173,230
INTERMITTENT MECHANISM
Filed Dec. 10, 1936    2 Sheets-Sheet 1

Inventor
Edward W. Kellogg
Attorney

Sept. 19, 1939.   E. W. KELLOGG   2,173,230
INTERMITTENT MECHANISM
Filed Dec. 10, 1936   2 Sheets-Sheet 2

Inventor
Edward W. Kellogg
By
Attorney

Patented Sept. 19, 1939

2,173,230

UNITED STATES PATENT OFFICE 2,173,230

INTERMITTENT MECHANISM

Edward W. Kellogg, Moorestown, N. J., assignor to Radio Corporation of America, a corporation of Delaware Application December 10, 1936, Serial No. 115,080

2 Claims. (Cl. 88—18.4)

This invention relates to intermittent mechanism, such as those utilized to impart intermittent motion to a moving picture film or the like, and has for its principal object the provision of an improved mechanism and method of operation which may be readily utilized to expose or project different numbers of picture frames per second.

It has been found that in order to avoid objectionable flicker on the screen the shutter must be designed to interrupt the light at a frequency of the order of 48 times per second or faster. Thus a two-blade shutter is satisfactory on a projector which is operating at 24 pictures per second. If the same projector is slowed down to 16 pictures per second and the flicker frequency drops to 32 pictures per second, the flicker becomes decidedly objectionable. It has therefore been regarded as necessary for any projector which must operate at two speeds, to provide a three-blade shutter or interrupt the light three times for each operation of the intermittent movement. This is very expensive of screen illumination.

Suppose, for example, the actual "pull down" time is 25% of the entire picture interval, as is the case with the usual Geneva movement. The light must be interrupted twice more while the picture is stationary in order to avoid too slow a flicker speed. The result would be that the light is interrupted three-fourths of the time. This would be very serious and to avoid so much loss of light, resort has been had to faster pull-down mechanisms. Thus. if the pull-down mechanism can operate in one-sixth of the entire period time, the total time of a dark screen can be cut to 50%, or if the pull-down time can be cut to one-eighth of the period, the total loss is cut to three-eighths, or the screen is illuminated five-eighths of the time. Such an extremely quick operating pull-down is feasible when the machine is running at low speed but presents very serious mechanical problems if the same mechanism must be operated at higher speed, tending to become noisy and to create excessive wear. On the other hand, when projecting the higher number of pictures it should not be necesasry to interrupt light three times per picture. Twice would be sufficient, and with only two interruptions, a pull-down requiring a greater fraction of the total time would be permissible.

The ideal projector for two speeds would therefore be one in which the actual time of pull-down was the same when projecting 16 or 24 pictures per second, the pull-down being performed as quickly as is consistent with conservative mechanical design. The pull-down would then occupy a smaller fraction of the time, when projecting 16 pictures per second and three interruptions per picture would not cause too serious a loss of illumination. On the other hand, when projecting 24 frames per second, only two interruptions per picture are necessary, and the pull-down can be permitted to occupy a greater portion of the entire picture period. Thus a projector of this type would operate its pull-down mechanism for both conditions as fast as conservative design would permit, and would also maintain the flicker frequency at an adequate rate but not unnecessarily high, since any rate of interruptions in excess of that required to prevent objectionoble flicker, involves a waste of possible screen illumination.

Further objects of the invention are (1) to provide an improved intermitent mechanism which is operable to expose or project pictures at any of several speeds as, for example, either sixteen or twenty-four picture frames per second, (2) to provide a mechanism by which the flicker frequency is maintained the same for any of the several projection speeds and the loss of light incident to an unnecessarily high flicker frequency is avoided, and (3) to provide an intermittent mechanism which operates without the noise and wear incident to the operation of previous mechanisms of this character.

More specifically stated, the invention, as applied to the problem of projecting either sixteen or twenty-four pictures per second, provides an intermittent mechanism which operates forty-eight times per second but skips every other stroke when projecting twenty-four pictures per second and skips two out of every three strokes when projecting sixteen pictures per second. In its broader aspects, it involves the provision of means for selecting and rendering effective different strokes of an intermittent mechanism.

The invention will be better understood from the following description when considered in connection with the accompanying drawings and its scope is indicated by the appended claims.

Figure 2:
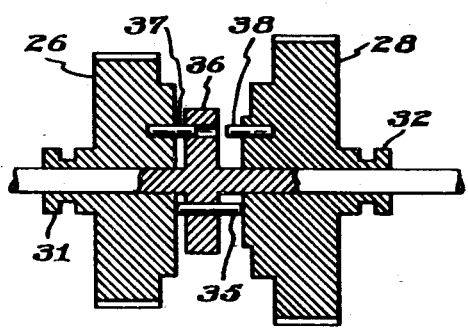
Figure 3:
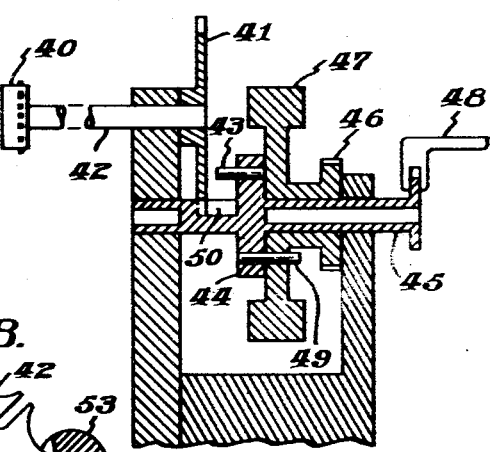
Figures 7, 8:
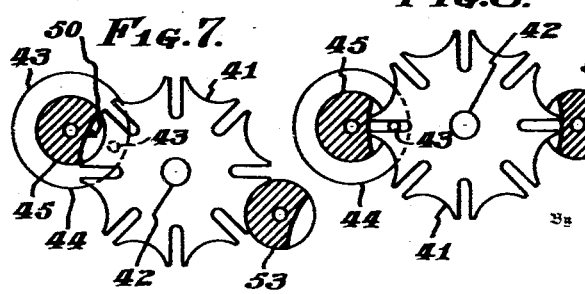
Figure 4:
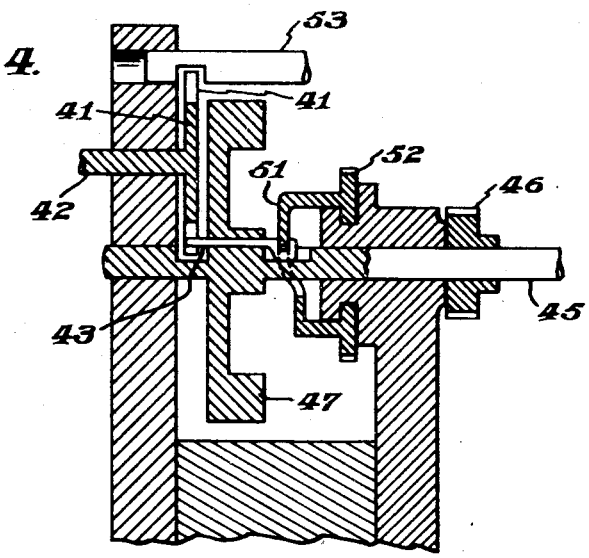
Figure 6:
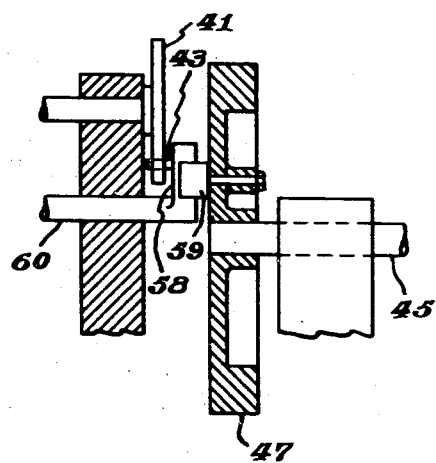
Figure 5:
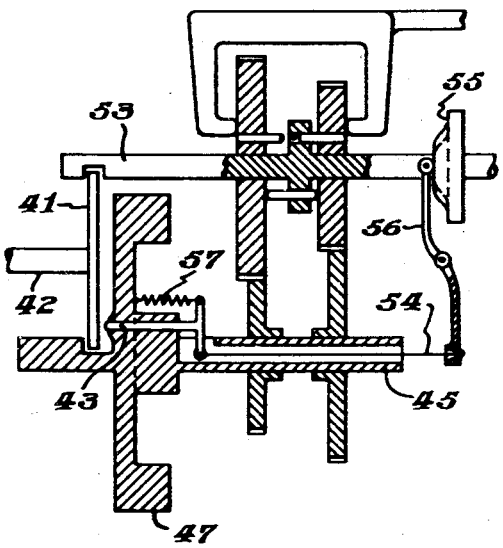

Referring to the drawings,

Figure 1 illustrates a claw type intermittent mechanism embodying the principles of the invention, Figure 2 illustrates a detail of Fig. 1, Figure 3 illustrates an embodiment of the invention wherein the pin of a Geneva movement is fixed to a shaft which is reciprocated along its axis to produce engagement of the pin and star wheel, Figure 4 illustrates a modification wherein the pin alone is reciprocated to effect its engagement with the star wheel, Figure 5 illustrates a modified arrangement for effecting movement of the star wheel pin, Figure 6 illustrates a modified intermittent mechanism, and Figures 7 and 8 illustrate certain details of Figs. 3 to 5.

It will be assumed, for the purpose of illustration, that the two desired speeds of operation are sixteen and twenty-four frames or picture changes per second.

The mechanism of Fig. 1 includes a shutter 10 which is driven through a shaft 11 from any suitable or customary source of power. Mounted on the shaft 11 are gears 12 and 13 and a cam 14 which operates through link members 15 and 16 to produce up and down movement of a claw 17. The claw 17 is fixed to a member 18 which is pivoted to the lower end of the link 16 at 19 and to the lower end of a member 20 at 21. The member 20 is pivoted at 22, is provided at its upper end with a cam follower 23 and is resiliently coupled to a yoke 24 through a spring 25.

In and out movement of the claw 17 is effected either (1) through the gear 12, a gear 26 and a cam 27 or (2) through the gear 13, a gear 28 and a cam 29.

The gears 26 and 28 are slidably mounted on a shaft 30, are provided respectively with slotted collars 31 and 22 which cooperate with the bifurcated extensions 33 and 34 of the yoke 24 and are spaced apart by a pin 35 which slidably extends through a keying flange 36. Fixed to the cams 27 and 29 are pins 37 and 38 which alternatively engage an opening in the disc 36 depending on the position of the yoke 24. The arrangement is shown in section in Fig. 2. The spring 25 is so arranged as to cause the follower to press against cam 29 when the yoke 24 is moved to its right hand position and to press against cam 27 when the yoke 24 is moved to its left hand position.

In shifting from the cam 27 to the cam 29, it is necessary to ensure that the proper phase relation is maintained between the cams 14, 27, and 29 so that the in-movement of the claw occurs at the highest point of its cycle, the out-movement occurs at the bottom of the cycle, and an unvaried relation is maintained between the shutter position and the stroke of the claw. The fact that gears 26 and 28, to which cams 27 and 29 are attached, are never out of mesh with gears 12 and 13, respectively, insures that cams 27 and 29 are properly related to cam 14. If the design is such that the operation of shifting from one cam to the other cam, under any conditions, permit the claw to engage the film when the claw is not in a suitable position therefor, some form of interlock is desirable to prevent the change being made at such times. Such an interlock is provided by pins 37 and 38 in conjunction with the hole in flange 36. In order to make the shift, it may be necessary to turn the machine over slowly by hand, while exerting a light pressure on the yoke 24, to cause it to move as soon as the cams are in proper relative position.

It will be noted that shaft 11 always rotates at the same speed, for example 2880 R. P. M. Film propelling devices in the machine, other than the claw 17, such as continuously rotating sprockets, of which there are usually several, cannot be driven with fixed gear ratio from the shaft 11. On the other hand, the speed of the shaft 30 is always equal to the number of working strokes of the claw. Therefore, such sprockets may be connected through gearing to the shaft 30, while the fixed speed shaft 11 is the logical place to connect the driving motor.

The operation of the mechanism will be readily understood without detailed explanation. Thus, with the yoke 24 in its illustrated position, the claw 17 moves in and out at a relatively rapid rate due to the relation between the gears 12 and 26. Movement of the yoke 24 to the left brings the cam 27 into engagement with the follower 23, and the claw 17 is moved in and out less rapidly because the cam 27 is rotating at a lower speed. It will be apparent that any desired relation between the two in and out claw movements may be established by a suitable choice of gear ratios, and corresponding design of the cams 27 and 29. Thus, if the desired speeds of the picture projection are sixteen and twenty-four per second, and forty-eight light interruptions per second is considered sufficient to prevent flicker, the shaft 11 would be provided with a single blade shutter, and would be driven at 48 revolutions per second or 2880 R. P. M., and the claw 17 makes 48 downward strokes per second. The gear 26 runs twenty-four revolutions per second and, if the cam 29 is controlling the in and out movements of the claw, it will permit the latter to engage the film twenty-four times per second, the engagement being suitably timed with reference to downward movements of the claw, which thus imparts movements to the film only during every other of its downward strokes.

If the yoke 24 is shifted to the left, the cam 29 is moved out of the way and the cam 27 brought into operative position, the cam follower 23 at the same time being urged to the right by the changed direction of force exerted by springs 25. The cam 29 advances the claw to engage the film only sixteen times per second or every third downward stroke.

Since there is a fixed relation between cam 14 and shutter 10, the latter obstructs the light during all downward movements of claw 17, and thereby meets the requirement that the light be shut off during the movement of the film. The other interruptions are necessary to avoid objectionable flicker, but the extra interruptions are never more frequent than needed for this purpose.

For high quality apparatus, a sprocket is often considered better than a claw. The present invention includes the application of the skip stroke principal to the well known Geneva movement for intermittent rotation of a sprocket. This application has the advantage that only circular movement occurs during the skip period and the tendency to noise and wear is reduced.

The mechanism of Fig. 3 includes an intermittent sprocket 40 which is driven from a star wheel 41 through a shaft 42. Cooperatively associated with the star wheel 41 is a pin 43 fixed to a member 44 and through this member to a shaft 45 upon which a drive gear 46 and a flywheel 47 are so mounted that the shaft may be moved endwise through them by means of a control member 48. Rotation of the member 44 and pin 43 with the gear 46 and flywheel 47 is insured by a pin 49 fixed to the member 44 and slidable through an opening in the flywheel web. As indicated more clearly in Figs. 7 and 8, the shaft 45 is recessed at 50 to permit movement of the star wheel 41 when this wheel and the pin 43 are engaged. When the pin is withdrawn by moving the shaft in Fig. 3 to the right, the slot in the shaft is no longer in the plane of the star wheel, and the latter is held stationary by the shaft, while the pin is disengaged. The number of picture frames projected per second is, of course, determined by the movement of the member 48 which may be controlled by cams or other suitable means as explained in connection with Figs. 1 and 2. An actuating member for the shaft is indicated at 48 in Fig. 3.

Since the in and out movements of the pin 43 occur fairly rapidly, it is desirable to minimize as far as possible, the mass of the reciprocated parts. Expedients for obtaining this result are shown in Figs. 4 and 5. In the arrangement of Fig. 4, the result is accomplished by means of a cam 51 which is driven by the gear 52. The pin slides in a hole through the flywheel 47 and is in part guided by a slot in the shaft 45. Since the movements of the pin depend on the difference in speed between the flywheel 47 and the cam 51, rather than on the absolute speed of the cam, the cam is rotated at one half the star wheel or pin wheel speed when it is desired to skip every other rotation, and at two-thirds the pin wheel speed when it is desired to select every third revolution. Since the shaft 45 is not reciprocated in this arrangement, there might be failure to hold the star wheel 41 stationary, when the slot in the shaft 45 is in the position to permit movement, but no movement is wanted, the pin being withdrawn for an idle pass. To lock the starwheel during idle passes of the pin, an extra slotted shaft 53 is provided. Shaft 53 is driven at the actual picture projection speed, and is so related to the remainder of the intermittent mechanism that its slot comes into the position which permits movement of the star wheel, only at the time of a working stroke of the pin. At all other times, one or the other of shafts 45 and 53 will keep the star wheel locked. Fig. 7 shows the positions of the slots in the two shafts during a skip stroke, the pin (which is withdrawn) being indicated by a dotted circle. Fig. 8 shows the positions of the slots during an active pass of the pin.

The arrangement shown in Fig. 5 has the merit of providing the most direct action possible of the cam on the pin 43. The cam must run at ⅔, and shaft 53 at ⅓ of the speed of shaft 45 when projecting sixteen pictures per second, while at twenty-four pictures per second, both shafts 45 and 53 run at half speed. The gear shift arrangements, however, would involve the same principles as explained in connection with Figs. 1 and 2 and would require similar interlocks.

Fig. 5 shows a skip stroke arrangement in which the pin is withdrawn during the skip-stroke by means of a very light tension rod 54, the purpose of this construction being to keep down the mass of the reciprocating parts while avoiding the gearing complications of Fig. 4. The movements are controlled through a cam 55, a bell crank 56 and a spring 57. The gear shift and phase control elements of this arrangement are similar to those of Fig. 1 and will be readily understood. It is not necessary in the skip stroke Geneva movement that the advance and withdrawal of the pin 43 be very closely timed since there is an interval of 225° in the case of an eight point star wheel in which to withdraw or advance the pin and this gives sufficient leeway so that the same cam may be used for either skip one or skip two action.

Fig. 6 shows an arrangement for speeding up the pull down in the case of a Geneva movement with an eight point wheel. The purpose of this design is to put as little as possible of the mass into those parts which rotate at non-uniform speed. The pin 43 is carried on a light crank arm 58 to which it is fixed. This crank is rotated at non-uniform speed by a shoe 59 which is pivoted on the flywheel 47. The shoe moves at uniform velocity but at one part of the revolution it is closer to the center of the pin crank and, therefore, rotates the latter at high velocity. As in the arrangement of the previous figures, means may be provided for engaging and disengaging the pin 43 from the star wheel 41. This result may be accomplished, for example, by reciprocating the crank pivot 60 or in any other suitable manner.

I claim as my invention:

1. Intermittent film feeding mechanism, including a shutter shaft operated at a speed which is the least common multiple of a plurality of desired film feed speeds, a shutter on said shaft for interrupting a light beam at least once for each revolution of said shaft, film engaging means, means on said shaft actuating said film engaging means in the film feeding direction at least once for each revolution of said shaft, a plurality of means geared to said shaft to operate at the said film feed speeds, and means connected to said film feeding means and adapted to selectively engage one or another of said means operated at the desired film feed speeds for causing the film engaging means to engage the film at the desired intervals.

2. Intermittent film feeding mechanism, including a shutter shaft operated at a speed which is the least common multiple of a plurality of desired film feed speeds, a shutter on said shaft for interrupting a light beam at least once for each revolution of said shaft, film engaging means, means on said shaft actuating said film engaging means in the film feeding direction at least once for each revolution of said shaft, a plurality of means geared to said shaft to operate at the said film feed speeds, means connected to said film feeding means for causing the film engaging means to engage the film at the desired intervals, and clutch means for selectively connecting the means connected to the film feeding means to one or another of said plurality of means.

EDWARD W. KELLOGG.